United States Patent [19]

Weitlow

[11] 4,150,726
[45] Apr. 24, 1979

[54] LAND PLANE

[76] Inventor: Jerry Weitlow, 5112 W. Maple, Paragould, Ark. 72450

[21] Appl. No.: 823,446

[22] Filed: Aug. 10, 1977

[51] Int. Cl.² .............................................. E02F 3/76
[52] U.S. Cl. ................................... 172/780; 172/711; 172/799; 180/140; 280/DIG. 9
[58] Field of Search ................ 172/4.5, 282, 285, 288, 172/289, 383, 400, 633, 711, 779, 780, 791, 792, 793, 795, 799; 180/45, 46, 50, 132, 140, 160; 280/91, 492, 493, 494, DIG. 9

[56] References Cited

U.S. PATENT DOCUMENTS

| 1,529,941 | 3/1925 | Bradley | 280/492 X |
|---|---|---|---|
| 2,195,607 | 4/1940 | Wilson et al. | 172/793 |
| 2,310,057 | 2/1943 | Boerma | 171/795 |
| 2,512,979 | 6/1950 | Strother | 180/140 |
| 2,593,880 | 4/1952 | Heavilin | 172/780 |
| 3,022,587 | 2/1962 | Greeley | 172/795 X |
| 3,081,567 | 3/1963 | Saul | 272/799 |
| 3,090,449 | 5/1963 | Ward | 172/400 X |
| 3,446,307 | 5/1969 | Logus | 180/140 |
| 3,856,102 | 12/1974 | Queen | 180/140 |
| 3,910,353 | 10/1975 | Ralston | 172/282 X |

*Primary Examiner*—Richard T. Stouffer
*Attorney, Agent, or Firm*—Bacon & Thomas

[57] ABSTRACT

A land plane for leveling or grading the surface of a land area including a frame having front and rear wheel assemblies, a center section and two end sections. A plurality of grader blades are supported below the center section which in turn may be raised away from and lowered towards the ground surface by pivoting the end sections of the frame with respect to the center section. Adjustable braces correct warps and distortion in the frame and permit accurate setting of the alignment and angular disposition of the blades with respect to the ground surface. Steering of the plane is controlled through a fluid system which coordinates the steering actions of the front and rear wheel assemblies and, alternatively, permits the rear wheel assembly to be steered independent of the front wheel assembly.

31 Claims, 11 Drawing Figures

LAND PLANE

BACKGROUND OF THE INVENTION

1. Field of the Invention

The invention is generally directed to apparatus which are utilized for the purpose of altering or shaping the surface configuration of land areas. More particularly, the invention relates to a vehicular land plane apparatus for grading and leveling land areas, particularly agricultural fields.

2. Description of the Prior Art

Land planes are well known in the prior art and typically comprise a wheeled frame carrying at least one grader blade that is adapted to contact and smooth the land surface. These apparatus are usually pulled by a separate towing vehicle such as a tractor or the like. Because land planes are primarily utilized for grading and shaping large areas of land, they are necessarily very large and specialized apparatus which are characterized by many requirements not normally encountered by similar apparatus or vehicles of smaller physical stature.

A land plane is generally composed of a large frame structure which is supported on steerable wheels so that the vehicle may physically negotiate about the entire area to be leveled. The frame structure, because of its great size and weight, inevitably undergoes warping or twisting due to the severe mechanical stresses realized during use. In attempting to overcome the undersirable warping of the frame structure, the prior art has suggested constructing the frame in various heavy and rigid truss designs. Such designs are supposed to keep warping and twisting of the frame to a minimum so that the grader blades attached thereto can be individually raised and lowered with respect to the ground surface in order to provide the proper blade alignment and grading depth.

The great length and substantial width of typical land levelers require specialized steering systems to safely accommodate effective steering of these vehicles during actual use and highway travel. This has normally been accomplished by providing a pair of steerable front wheels, the steering movements of which are usually directly coordinated with a pair of steerable rear wheels through rigid cables or mechanical linkages. In this way, turning of the front wheels in one direction will automatically cause the rear wheels to turn the same degree, though in an opposite direction, so that the distant rear end of the apparatus may negotiate a desired change in direction.

Another requirement of these specialized apparatus is the provision of some means for either raising the grader blades suspended beneath the frame or raising the entire frame with the blades attached thereto to a sufficient height to permit road travel or clearance of ground surface obstructions. The prior art has proposed to satisfy this requirement in several ways. For example, it is known to mount the grader blades to a subframe which is independently hinged to the lower portion of the primary frame so that the subframe may be lowered and raised with respect to the primary frame, the latter being supported at a comparatively high distance off of the ground surface. It is also known to construct the frame in pivotally connected sections, including a center section and two end sections, whereby pivoting of the end sections will cause the center section to be raised and lowered, along with its attached grader blades, while maintaining itself parallel with respect to the ground surface.

Exemplary of typical prior art devices which provide some indication of the state of the art to which the present invention pertains are the Kenney U.S. Patent No. 2,994,143, Saul U.S. Pat. No. 3,081,567, Constantin U.S. Pat. No. 3,172,218, Purdy U.S. Pat. No. 3,348,323 and Estes U.S. Pat. No. 3,800,884.

SUMMARY OF THE INVENTION

It is an object of the invention to provide a land plane having a steering system which permits the plane to easily and safely negotiate turns both in use and during highway travel.

It is another object of the invention to provide a land plane that can quickly compensate for warps and distortions in the frame structure due to mechanical stresses and thereby accurately align the grader blades.

It is yet another object of the invention to provide a land plane having an improved system for raising and lowering the frame structure, thereby permitting the plane to avoid ground obstructions and undergo highway travel.

It is again a further object of the invention to provide an improved land plane which is capable of efficiently grading or leveling land surfaces under a variety of conditions.

It is still yet another object of the invention to provide an improved land plane which is characterized by simplicity in design and economy in manufacture.

The invention achieves the foregoing and other objects by providing an improved land plane which includes a frame having a center section and two end sections pivotally connected to the front and rear of the center section. A plurality of grader blades are clamped onto the lower portion of the center section by brackets which permit angular adjusment of the blades and also their complete retraction within the area of space defined by the lower portion of the center section. A fluid cylinder-actuated cable assembly is provided for the pivoting of the end sections away from the center section so that the latter can be raised and lowered with respect to the ground surface while being maintained parallel thereto. The end sections are each provided with a pair of steerable wheels for supporting the entire frame structure. The front end section is provided with a tongue for attachment to a tow vehicle, which tongue also actuates a fluid cylinder by the front axle. The intake and output lines of this cylinder are in fluid communication with a similar cylinder carried by the axle of the rear wheels so that the latter wheels may be directly steered in the same degree but in an opposite direction with the steering of the front wheels. Alternatively, a valving arrangement permits direct connection of the tow vehicle hydraulics to the fluid cylinder of the rear wheels for the steering thereof independent of the front wheels.

Other objects, features and advantages of the invention will be apparent from the following description of the specific embodiments thereof, with reference to the accompanying drawings, which form a part of the specification, wherein like reference characters designate corresponding parts of the several views.

DETAILED DESCRIPTION OF THE PREFERRED EMBODIMENTS

Figure 1:
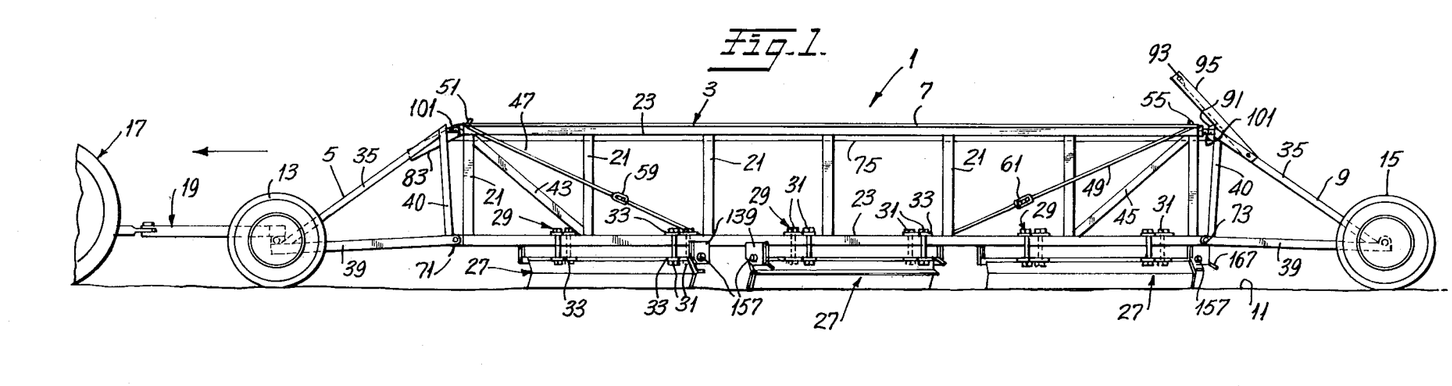
FIG. 1 is a diagrammatic side elevational view of the land plane of the present invention.
Figure 2:
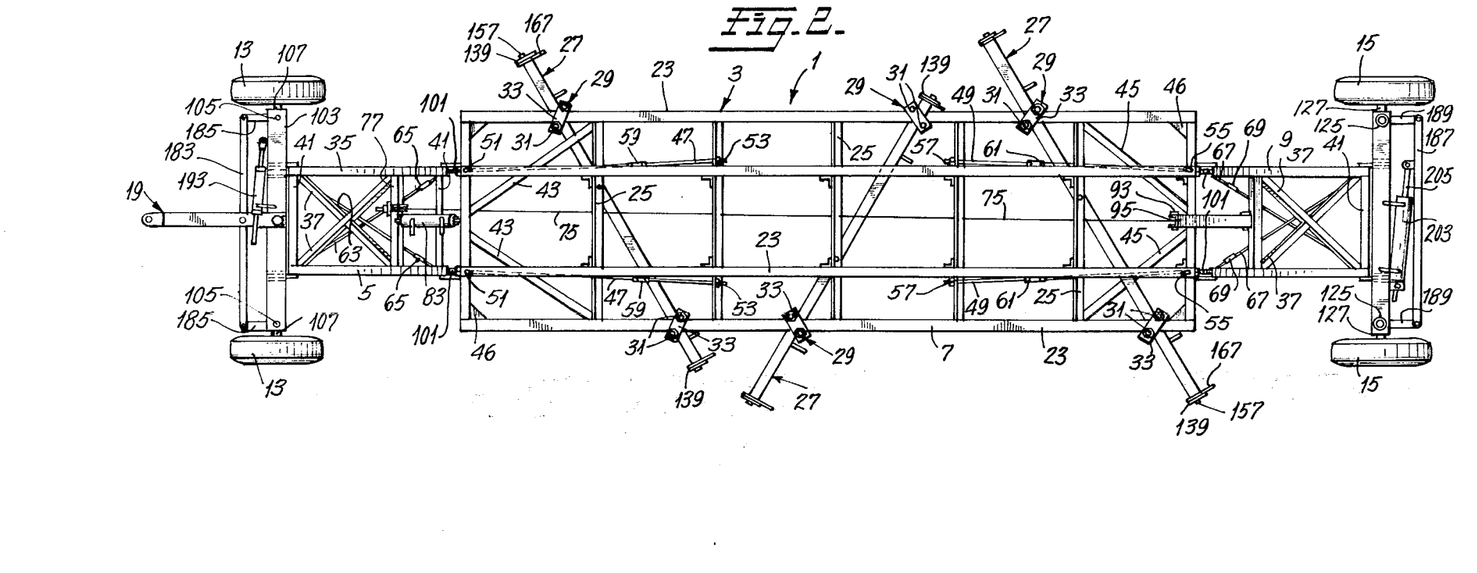
FIG. 2 is a plan view of the plane of FIG. 1.

As shown in FIGS. 1 and 2, a land plane 1 according to the present invention includes a frame 3 having a front end section 5, a center section 7 and a rear end section 9. Frame 3 is supported for travel over ground surface 11 by means of a front pair of steerable wheels 13 carried by end section 5 and a rear pair of steerable wheels 15 carried by end section 9. In use, plane 1 is pulled over ground surface 11 by a towing vehicle, generally indicated at 17, in the form of a tractor or similar agricultural vehicle. Plane 1 is connected to vehicle 17 by means of a tongue assembly 19.

Center section 7 is constructed from a plurality of vertical channel sections 21, longitudinal channel sections 23 and transverse channel sections 25. Channel sections 21, 23 and 25 are preferably of metal and connected together, by welding or similar means, to define a substantially rectangular structure forming the overall configuration of center section 7.

A plurality of grader blade assemblies 27 are clamped to outermost channel sections 23 forming the bottom of center section 7. This is achieved by means of a plurality of brackets 29, each of which, when loosened by adjusting a pair of bolts 31, permit the alignment and angular disposition adjustment of blade assemblies 27. Brackets 29 also permit swinging the outer extremities of blade assemblies 27 underneath center section 7 to positions within the perimeter of the general area defined by the bottom of center section 7 in order to minimize the overall width of leveler 1 during highway travel. Each bracket 29 includes a pair of spaced apertured plates 33 held together by bolts 31. As more clearly seen in FIG. 1, each bracket 29 includes one plate 33 abutting channel section 23 and the other associated plate 33 passing through and securing an end of grader blade assembly 27.

As seen in FIG. 2, end sections 5 and 9 are narrower in width than center section 7, with each having a substantially right angle triangular configuration when viewed from the side, as evident in FIG. 1. Sections 5 and 9 are each constructed from a pair of inclined channels 35, a pair of diagonal channels 37, a pair of longitudinal channels 39, a pair of vertical channels 40 and a pair of lower transverse channels 41. Channels 35, 37, 39, 40 and 41 are preferably secured together through welding or similar connecting means.

Center section 7 also includes a pair of front diagonal braces 43, a pair of rear diagonal braces 45 and a plurality of corner plates 46 for imparting greater overall strength to the outer ends of section 7.

Because of the rather large size of frame 3, the great weight accompanying such size has a tendency to twist and warp center section 7 and its respective end sections 5 and 9 during use. This problem is inevitable for framework or truss-like structures of this nature, particularly in the presence of mechanical movement and stresses imparted thereby. To overcome and compensate for warping and twisting of frame 3, center section 7 is provided with a pair of front adjustment rods 47 and a pair of rear adjustment rods 49. Rods 47 have one pair of ends secured to the front upper corner of center section 7, preferably by hooking through longitudinal channel sections 23 as indicated at 51. The other ends of rods 47 may be bolted to a transverse channel section 25 as indicated at 53. Similarly, rods 49 are secured by hooking through sections 23 as indicated at 55 and bolted to channel 25 as indicated at 57. A pair of adjustable toggles 59 are provided for rods 47 and a similar pair of adjustable toggles 61 are provided for rods 49. Therefore, by selectively tightening or loosening individual toggles 59 and 61, any distortion or warp in the overall configuration of center section 7 can be accordingly overcome and corrected.

As seen in FIG. 2, end section 5 is also provided with a pair of front end adjustment rods 63 which are disposed in a crossed manner and connected at their extremities to the four corners defined by longitudinal channels 39 and transverse channels 41. A pair of toggles 65 permit the individual tightening or loosening of rods 63 for the purpose of correcting any distortion or warp realized by end section 5. A similar arrangement is provided for end section 9 in the form of a pair of diagonally crossed rear end adjustment rods 67 which are tightened or loosened by a pair of toggles 69.

The corner junctions defined by longitudinal channels 35 and transverse channel 41 of end sections 5 and 9 are pivotally connected to bottom transverse channel 25 disposed at the opposite ends of center section 7. This is generally indicated at 71 and 73, respectively. As more clearly shown in FIG. 3, when end sections 5 and 9 are caused to pivot away from center section 7, the latter section is raised, along with blade assemblies 27, vertically away from ground surface 11 while constantly being maintained parallel with respect thereto. Thus, by raising center section 7 to the desired height, plane 1 may then avoid ground obstructions as well as be suited for highway travel.

Figure 5:
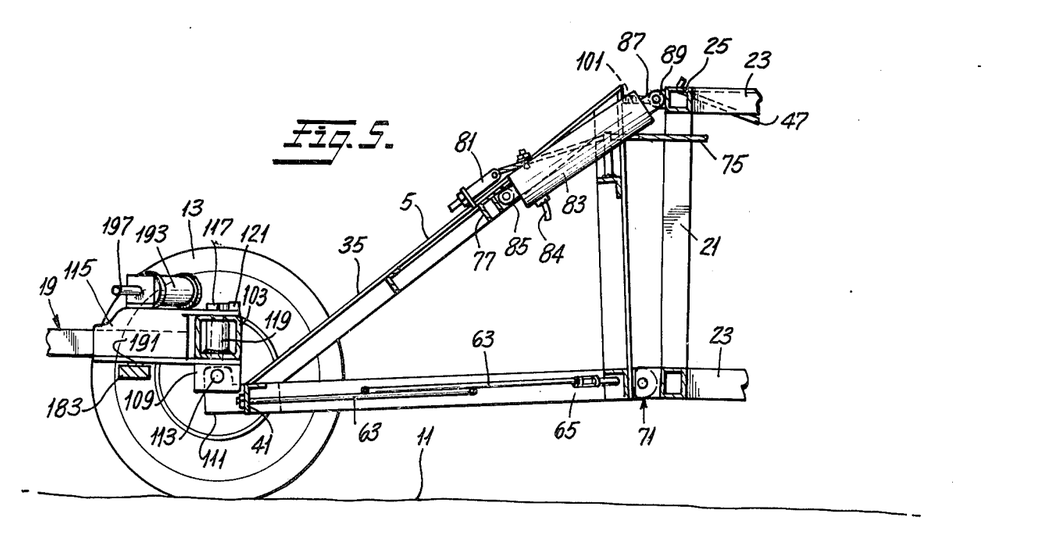
FIG. 5 is a fragmentary vertical sectional view, taken on the line 5—5 of FIG. 4.
Figure 6:
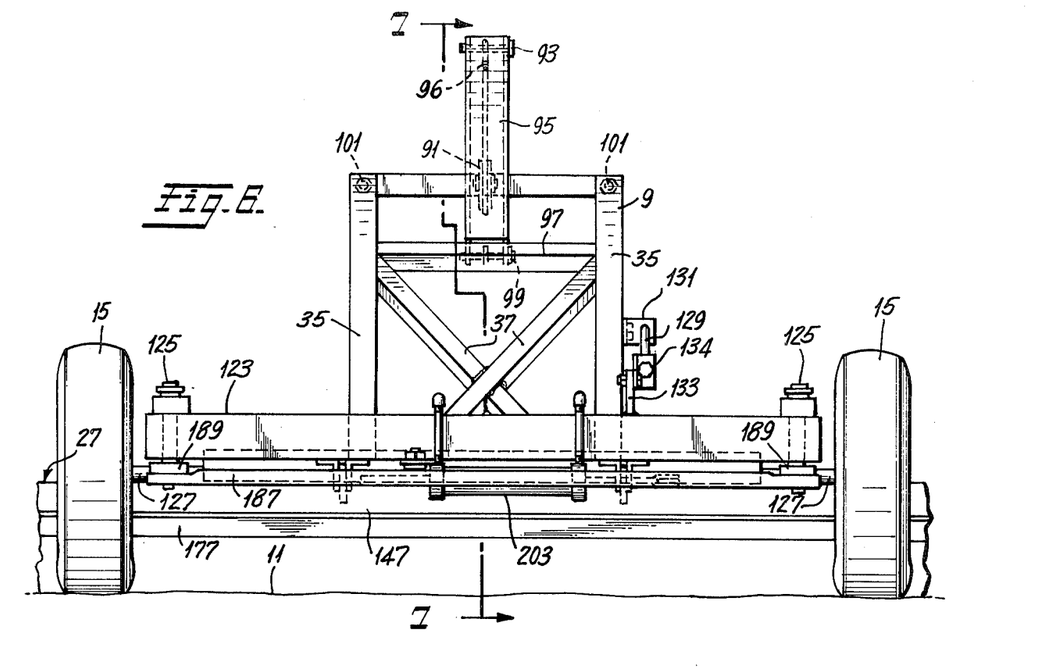
FIG. 6 is a fragmentary elevational view of the rear end section of the plane.
Figure 7:
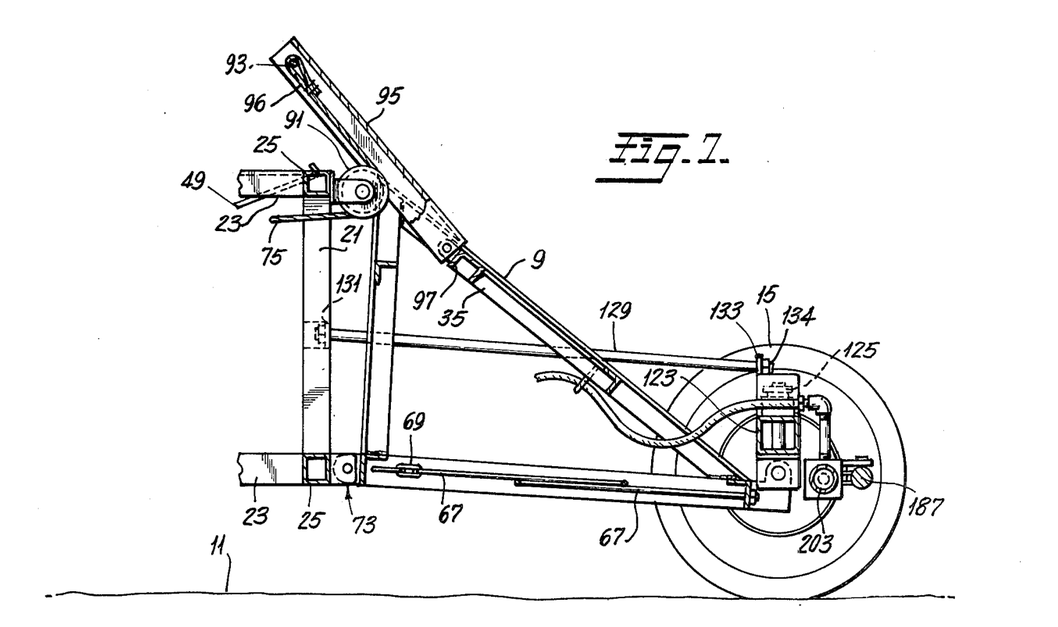
FIG. 7 is a fragmentary vertical sectional view taken on the line 7—7 of FIG. 6.

The raising and lowering of center section 7 is achieved by means of a cable 75 having one end bolted to a crossbar 77 provided on end section 5. The connection of cable 75 to crossbar 77 is accomplished through an adjustable bolt clamp 81 as shown in FIGS. 4 and 5. Clamp 81 permits the tightening or loosening of cable 75 for the purpose of increasing or decreasing tension therein. Also carried by crossbar 77 is a fluid cylinder 83 which receives operating fluid through inlet 84 and is pivotally connected at one end to crossbar 77 as indicated at 85. An extensible piston 87 disposed in cylinder 83 has its free end pivotally connected to a transverse channel 25 of center section 7. This pivotal connection is generally indicated at 89. Referring back to FIG. 3, it is seen that cable 75 extends from end section 5, across center section 7 and around a sheave or pulley 91 connected to a transverse channel section 25 at the other end of center section 7. Referring now to FIGS. 6 and 7, it is seen that the free end of cable 75 is secured around a bolt 93 provided at the outer end of a compression bracket 95 by means of a cable clamp 96. The other end of bracket 95 is secured to a cross brace 97 provided on end section 9. This may be achieved by means of a bolt assembly 99 or similar securing means. As seen in FIG. 7, bracket 95 is inclined towards center section 7 to thereby impart a compressive force against end section 9 when tension is placed in cable 75. Therefore, when cylinder 83 is actuated to extend piston 87, end section 5 will be pivoted away from center section 7 and tension is placed in cable 75. This causes a corresponding compressive force on bracket 95 as cable 75 is pulled around pulley 91 towards end section 5. End section 9 is thereby caused to pivot away from center section 7 in the same degree of pivotal movement realized by end section 5. In this way, center section 7 is then raised vertically away from ground surface 11 while constantly being maintained parallel with respect thereto.

Figure 3:
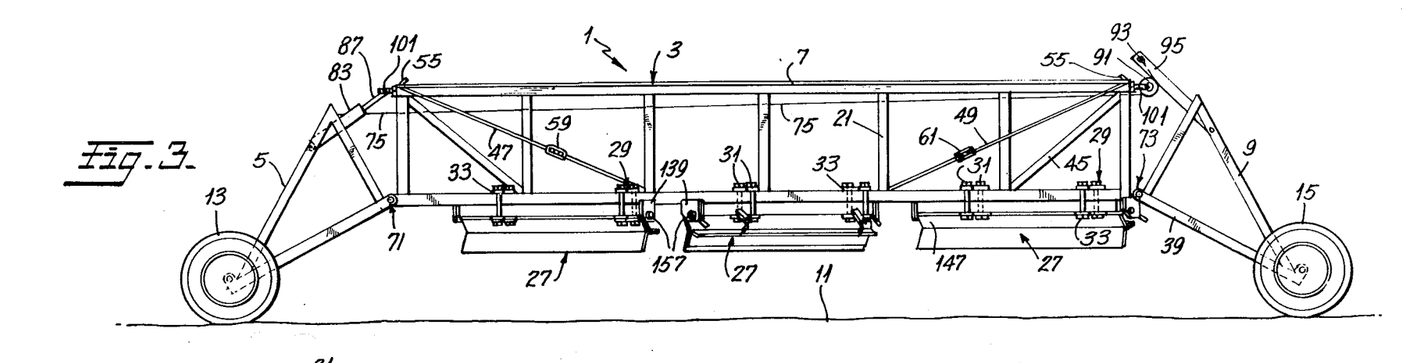
FIG. 3 is a side elevational view similar to FIG. 1 but showing the plane frame in its elevated position.
Figure 4:
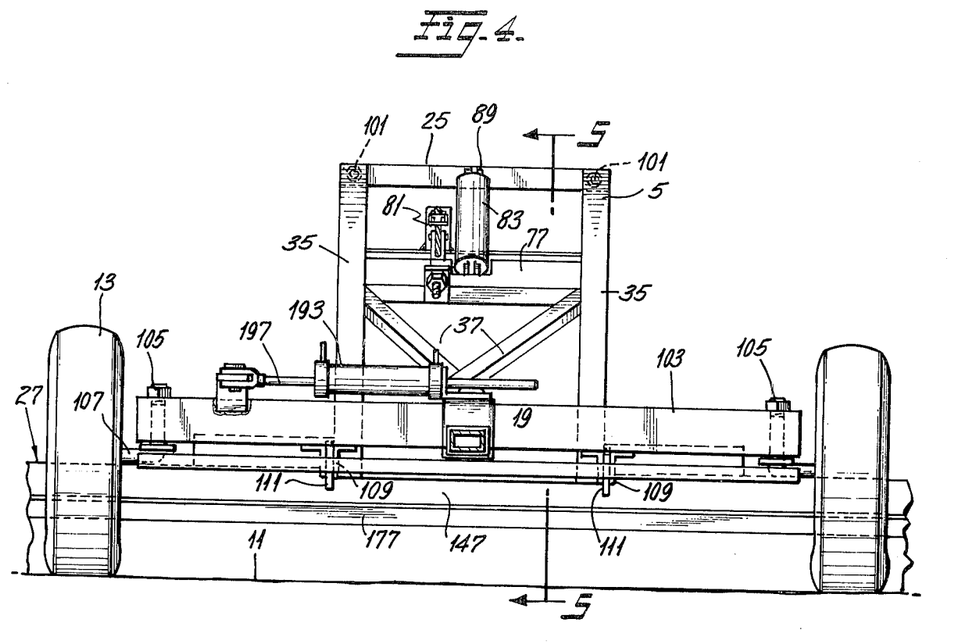
FIG. 4 is a fragmentary elevational view of the front end section of the plane.

As seen in FIGS. 2, 3 and 4, a pair of abutment bolts 101 are provided in the upper corners of center section 7 for the purpose of adjustably limiting the spacing between the corresponding adjacent upper corners of end section 5 and center section 7. A similar pair of abutment bolts 102 are provided at the other end of center section 7 for limiting the spacing between the corresponding adjacent upper corners of end section 9 and center section 7.

The manner in which front wheels 13 are mounted to end section 5 shall now generally be described with reference to FIG. 2 and in particular detail with reference to FIGS. 4 and 5. Wheels 13 are supported for rotation at the opposite ends of a front axle 103 by means of a pair of spindles 105 which are rotatably journaled through the opposite ends of axle 103. Spindles 105 are substantially of L-shape or right angle configuration and serve to rotatably support wheels 13 upon a pair of laterally extending leg portions 107. Axle 103 is provided with two pairs of spaced downwardly extending apertured flanges 109. Each pair of flanges 109 receives an upwardly extending apertured tab 111 carried by front transverse channel 41 of end section 5. Tabs 111 are each pivotally secured within its corresponding pair of flanges 109 by a bolt assembly 113. Thus, when end section 5 is pivoted away from center section 7 by the action of cylinder 83, section 5 will only pivot about bolts 113, thereby permitting spindles 105 to maintain stationary positions during pivoting. This arrangement also permits axle 103 to remain stationary during the raising and lowering of center section 7.

As also seen in FIGS. 4 and 5, tongue assembly 19 is provided with a yoke 115 which receives the midpoint of axle 103 and is secured thereto by means of a pin bolt 117. Axle 103 is depicted in FIG. 5 as being of a hollow configuration and provided with an internal sleeve 119 which is welded to the internal walls of axle 103. Bolt 117 is rotatably journaled within sleeve 119. An abutment block 121 is provided on the upper portion of yoke 115 to secure the head of pin bolt 117 against rotation with respect to yoke 115.

Referring now to FIGS. 6 and 7, it is seen that rear wheels 15 support end section 9 through a rear axle 123 a pair of right angle-shaped spindles 125 rotatably journaled therein in a manner similar to that shown for front wheels 13. A pair of legs 127 extend laterally outwardly from the lower portions of spindles 125 to rotatably support wheels 15. To assure stability during the rearward pivoting of end section 9 away from center section 7 and also during steering of wheels 15, a stabilizer bar 129 is provided for connecting the rear portion of center section 7 to rear axle 123. This is achieved by bolting one end of bar 129 to a flange 131 carried by a vertical channel section 21 of center section 7, as indicated at 132, and bolting the other end of rod 129 to a vertically extending flange 133 connected to the upper portion of rear axle 123, as indicated at 134. The connections of rod 129 at flanges 131 and 133, as shown in FIG. 7, are such as to permit a certain degree of pivotal movement about these connections so that when end section 9 is pivoted away from center section 7, rod 129, the lower portion of vertical channel section 21 to which it is connected, rear axle 123 and longitudinal channels 39 substantially define a variable parallelogram during the pivoting movement.

Figure 8:
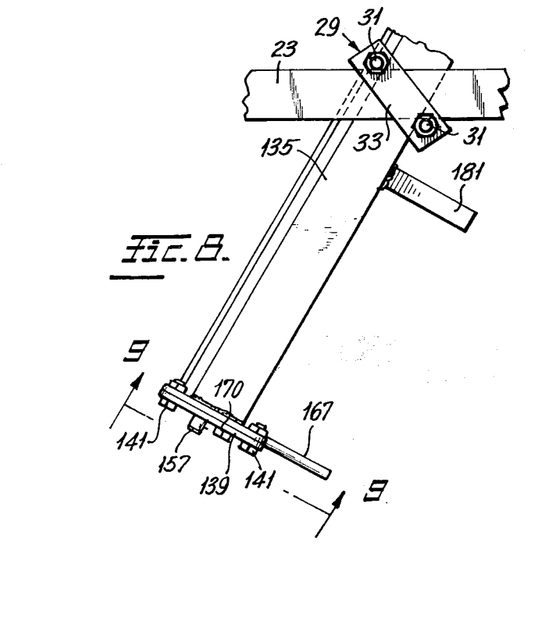
FIG. 8 is an enlarged fragmentary plan view of a grader blade assembly.
Figure 9:
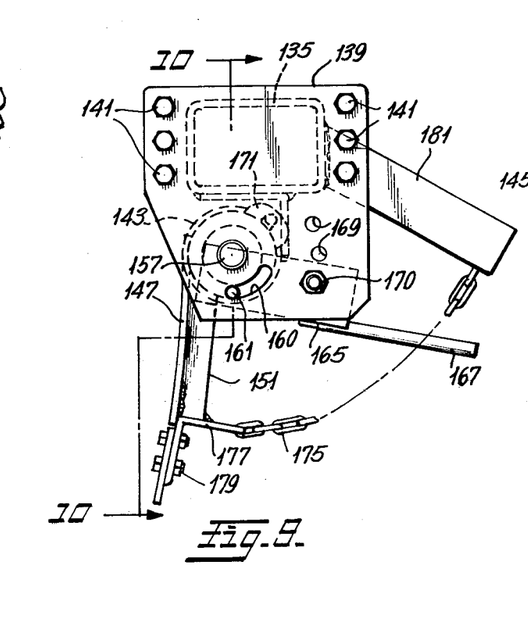
FIG. 9 is an enlarged end view of the grader blade assembly taken on the line 9—9 of FIG. 8.

The details of grader blade assemblies 27 and the manner in which assemblies 27 are mounted to center section 7 shall now be described with reference to FIGS. 8 through 10. As previously indicated, each blade assembly 27 is secured to the outside longitudinal channel sections 23 of center section 7 by means of two brackets 29. Blade assembly 2 includes a cross channel 135 which is secured in abutting relationship against the bottom portion of longitudinal channel sections 23 by brackets 29. A cap plate 137 is secured, as by welding, to each end of cross channel 135. A pair of support plates 139 are secured over cap plates 137 by means of a plurality of bolt assemblies 141.

As evident in FIGS. 9 and 10, plates 139 extend downwardly below the bottom surface of channel 135. A sleeve 143 is secured to the bottom surface of channel 135 adjacent the opposite ends thereof for rotatably receiving a blade support pipe 145. A grader blade 147 is secured to pipe 145, preferably by welding as indicated generally at 149. A plurality of braces 151 may be interdisposed between blade 147 and pipe 145 along the length of blade 147 for imparting greater strength and rigidity to the attachment of blade 147 to pipe 145. Braces 151 may be welded to pipe 145, as generally indicated at 153, and also to blade 147, as generally indicated at 155.

Pipe 145 includes a pair of end axles 157 which are rotatably received within apertures 159 provided in plates 139. An arcuate shaped slot 160 is also provided in support plate 139 for receiving an end 161 of a coil spring 163. An adjustable tension plate 165 is provided with an aperture 167 which also receives spring end 161. A handle 167 permits plate 165 to rotate and be set in any one of several positions determined by a plurality of spaced apertures 169 provided in plate 139. Each position is maintained by a removable bolt assembly 170 which secures plate 165 in a fixed manner with respect to plate 139, thereby increasing or decreasing the amount of tension in spring 163. This arrangement is provided at the opposite ends of all grader assemblies 27.

Figure 10:
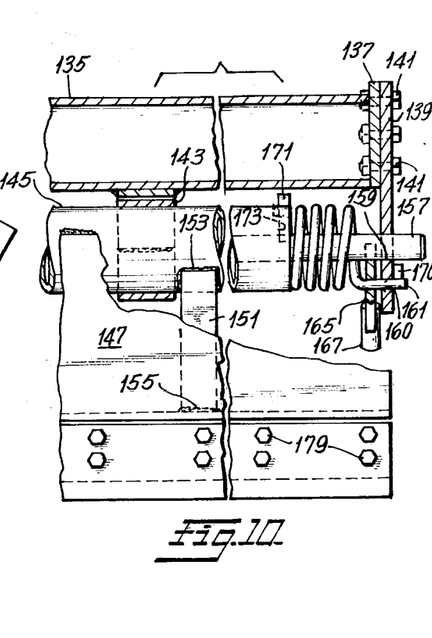
FIG. 10 is a fragmentary vertical sectional view, taken on the line 10—10 of FIG. 9.

As indicated in FIG. 10, the opposite end 171 of spring 163 is secured within a recess 173 formed within the end of pipe 145. Because the opposite ends of pipe 145 are biased by a pair of springs 163, it is therefore apparent that pressure placed against the working surface of blade 147 causes pipe 145 to rotate rearwardly in a counterclockwise direction against the combined forces of springs 163. This degree of rotational movement is determined by the preset tension in springs 163 and therefore provides resiliency to blade 147 for the purpose of preventing damage thereto when obstacles or unfavorable ground conditions are encountered. The forward or clockwise rotational movement of blade 147 is limited by a plurality of chains 175. One end of each chain 175 is connected to a right angle shaped channel strip 177 that is secured adjacent and behind the leading edge of blade 147 by means of bolt assemblies 179. The other end of each chain 175 is connected to a plurality of rearwardly extending arms 181 welded to the back section of channel 135. Thus, the forward or clockwise rotational movement of each blade 147 may be controlled by adjusting the length of chains 175.

Figure 11:
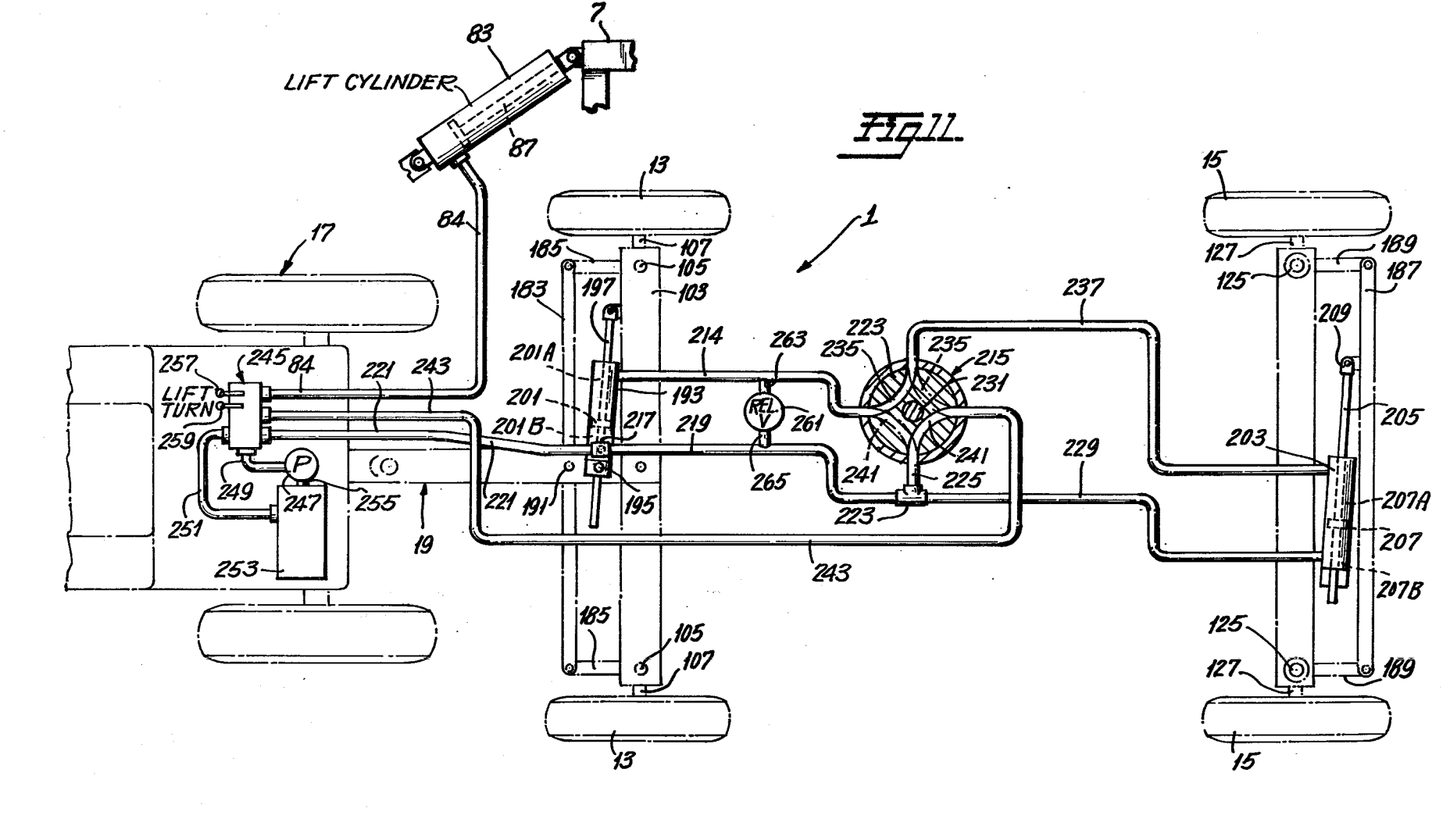
FIG. 11 is a schematic diagram of the steering system for the plane of the present invention.

The steering system for plane 1 shall now be described with reference to FIG. 11. As previously indicated, plane 1 includes a pair of front steerable wheels 13 rotatably mounted on laterally extending leg portions 107 of spindles 105, the latter being rotatably journaled within opposing ends of front axle 103. Similarly, rear steerable wheels 15 are rotatably mounted on their corresponding laterally extending leg portions 127 of spindles 125 which are in turn rotatably journaled at the opposite ends of rear axle 123. Plane 1 is connected to and pulled by towing vehicle 17, in the form of a tractor or the like, through hitch assembly 19.

Front axle 103 includes a tie rod 183 and a pair of corresponding pivot rods 185 having a pair of their ends pivotally connected to the opposite ends of rod 183. The other ends of pivot rods 185 are connected to spindles 105 such that transverse movement of rod 183 with respect to the longitudinal axis of plane 1 will cause rods 185 to move a corresponding amount while maintaining a parallel relationship therebetween. Such movement will also cause spindles 105 to rotate together either clockwise or counterclockwise, depending upon the transverse direction in which rod 183 is moved. As is evident, rotation of spindles 105 will cause wheels 13 to be steered in either the left or right direction through leg portions 107.

A similar arrangement is provided for rear axle 123 which also includes a tie rod 187 and a pair of corresponding pivot rods 189 having a pair of their ends pivotally connected to the opposite ends of rod 187. The other ends of pivot rods 189 are connected to spindles 125 such that transverse movement of rod 187 with respect to the longitudinal axis of plane 1 will cause wheels 15 to be steered in either the left or right direction by leg portions 127.

Steering of wheels 13 and 15 is achieved about the vertical axes of rotation of spindles 105 and 125 only, with front axle 103 and rear axle 123 always remaining stationary with respect to frame 3 of plane 1.

Tongue assembly 19 is pivotally connected to front axle 103 through pin bolt 117. Assembly 19 is also pivotally connected to rod 183 approximately midway between the opposite ends thereof as indicated at 191. In this manner, lateral movement of assembly 19 as tow vehicle 17 turns will effect transverse movement of rod 183 to thereby permit steering of wheels 13 in either the left or right direction.

A front fluid cylinder 193 is connected to assembly 19 as indicated at 195. Connection 195 may either rigidly secure cylinder 193 to assembly 19 or, alternatively, permit cylinder 193 to pivot about connection 195. A piston rod 197 is disposed within cylinder 193 and includes a free end which is pivotally connected to front axle 103 as indicated at 199. Rod 197 includes a piston 201 which defines chambers 201A and 201B on the opposite sides thereof with the interior walls of cylinder 193. Lateral movement of tongue assembly 19 serves to extend or retract rod 197 with respect to cylinder 193, the latter being stationary with respect to and moves together with tongue assembly 19 by virtue of connection 195.

Steering of rear wheels 15 is accomplished through a rear fluid cylinder 203 mounted to rear axle 123 which includes a piston rod 205 and an associated piston 207, the latter defining chambers 207A and 207B on the opposite sides thereof with the interior walk of cylinder 203. A free end of rod 205 is pivotally connected to tie rod 187 as indicated at 209. In this manner, transverse movement of rod 187 is achieved by the extension and retraction of rod 205 within cylinder 203. This causes pivot rods 189 to rotate spindles 125, thereby causing wheels 15 to steer in either the left or right direction, depending upon the extension or retraction of rod 205 with respect to cylinder 203.

Fluid entering or exiting chamber 201A of cylinder 201 passes through a line 214 which communicates directly with a first control valve 215. Fluid entering or exiting from chamber 201B of cylinder 193 passes through a first tee fitting 217 and into a pair of lines 219 and 221. Line 219 communicates with control valve 215 through a second tee fitting 223 and a line 225. Fluid from tee fitting 223 is directed to chamber 227B of cylinder 203 through a line 229. Control valve 215 includes a central actuation spindle 231 which rotates a coaxially disposed control element 233. In the position of element 233 as depicted in FIG. 11, a first passageway 235 provides fluid communication between line 214 and a line 237, the latter further communicating with chamber 207A of cylinder 203. A second passageway 241 in element 233 provides fluid communication between line 225 and a line 243.

Upon rotating element 233 ninety degrees in the clockwise direction through spindle 231, passageway 235 in this position of element 233, as indicated in dotted lines, will provide fluid communication between lines 237 and 243. Similarly, passageway 241 in this position of element 233, as indicated in dotted lines, will provide fluid communication between lines 214 and 225, the latter being in further communication with lines 219 and 229.

Lines 221 and 243 are also connected to a second control valve 245 disposed on tow vehicle 17. Valve 245 is connected to a gaseous or hydraulic fluid pressure system 246 of vehicle 17. System 246 includes a pump 247 which is in fluid communication with valve 245 through a line 249. A line 251 also connects valve 245 to a source of fluid 253, the latter being in communication with pump 247 through a line 255. Valve 245 is provided with a first control handle 257 which serves to direct fluid to or remove fluid from line 84 for the purpose of extending or retracting piston rod 87 disposed within cylinder 83. A second control handle 259 serves to direct fluid into or remove fluid from lines 221 and 243. In addition, handle 259 also permits valve 245 to assume a neutral position which does not permit fluid to enter into or exit from lines 221 and 243 at their connections to valve 245.

It is understood that first and second valves 215 and 245, respectively, are basically four-way valves well known in the art, but that any other equivalent type of valving or fluid control mechanisms suitable for the purposes intended and described required functions may also be utilized in the practice of this invention.

A relief valve 261 provides communication between lines 214 and 219 through a pair of lines 263 and 265, respectively, and functions to open and bypass fluid between lines 214 and 219 when a maximum predetermined pressure differential is realized therebetween. This serves to synchronize the pressures between the chambers of cylinders 193 and 203.

MODE OF OPERATION

The manner in which plane 1 of the present invention is placed into operative use shall now be described. Assuming plane 1 has been connected to tow vehicle 17 through hitch assembly 19 and has been towed to the ground area to be leveled or graded, the initial procedure comprises the aligning and setting of the angular dispositions of grader blade assemblies 27.

The aligning and angular positioning of blade assemblies 27 with respect to the longitudinal axis of center section 7 and ground surface 11 are accomplished by first loosening bolts 31 of brackets 29 and sliding the latter along longitudinal channels 23. Cross channels 135 may also be pulled or pushed through their corresponding pairs of brackets 29. Once blade assemblies 27 have been placed in their respective desired positions, bolts 33 of brackets 29 may then be tightened to secure blade assemblies 27 against longitudinal channels 23 of center section 7.

Because brackets 29 rigidly clamp blade assemblies 27 to center section 7, it is critical that any warps or distortions in the overall structure of center section 7 be removed in order to assure that blade assemblies 27 are substantially parallel with respect to ground surface 11. This is accomplished by selectively tightening or loosening front and rear adjustment rods 47 and 49 through toggles 59 and 61, respectively. After the alignment and disposition of blade assemblies 27 have been accomplished, any warps and distortions in the frame structures making up front end section 5 and rear end section 9 are then removed. This is achieved by selectively tightening and loosening the two crossed pairs of front and rear end adjustment rods 63 and 67 through their respective pairs of toggles 65 and 69. Such adjustment of end sections 5 and 9 serve to level the entire frame structure 3 since the latter is entirely supported above ground surface 11 by wheel assemblies 13 and 15 carried by end sections 5 and 9, respectively.

The next step in preparing plane 1 for use is in setting the depth of grader blades 147 with respect to ground surface 11. This is accomplished by actuating handle 257 of second control valve 245 to thereby permit fluid pressure from fluid system 246 to enter line 84 of cylinder 83. This extends piston 87 from cylinder 83 and causes end section 5 to pivot away from center section 7 about pivot connections 71. Simultaneously, tension is placed in cable 75 and resulting compression is imparted to bracket 95 so that end section 9 will be caused to pivot away from center section 7 about pivot connections 73 in a corresponding amount. Reversal of handle 257 causes fluid pressure to be removed from line 84, thereby retracting piston 87 within cylinder 83. This causes end sections 5 and 9 to pivot towards center section 7 and lowers the latter towards ground surface 11. When the desired grading depth of blades 147 has been set by raising and lowering center section 7 according to this procedure, handle 257 of valve 245 is then actuated to terminate fluid flow through line 84 so that center section 7 will be maintained at the required height. At this point, adjustment bolts 101 and 102 are extended until the free ends thereof abut end sections 5 and 9, respectively. In this way, end sections 5 and 9 are solidly abutted against center section 7 through bolt 101 and 102 without relying upon fluid pressure in cylinder 83 for maintaining center section 7 in its desired position.

Once the alignment and disposition of grader blade assemblies and grading depth have seen set, the operator may then selectively position the amount of resilient force biasing each blade 174 in its operative position. This depends upon the nature and condition of ground surface 11 and is accomplished by positioning bolt 170 within the selected aperture 169 at each end of each blade assembly 27. Chains 175 permit each blade 147 to pivot rearwardly when encountering an obstruction or similar obstacle, but limit the forward bias movement to the extent of the predetermined length of chains 175.

When the above procedures have been completed, plane 1 is then ready for use. During the pulling of plane 1 over ground surface 11 by tow vehicle 17, the fluid operated steering system of plane 1 as depicted in FIG. 11 offers the operator two distinct alternatives, thereby assuring that plane 1 safely and efficiently turns under all conditions.

The first alternative system for steering plane 1 shall now be described with reference to FIG. 11. In this system, handle 259 of second control valve 245 is placed in a neutral position, thereby preventing fluid flow to or from lines 221 and 243 at their connections to valve 245. Second control valve 215 is set so that passageway 235 provides fluid communication between lines 214 and 237 (as indicated in solid lines) and passageway 241 provides fluid communication between lines 225 and 243 (as indicated in solid lines). Assuming vehicle 17 is negotiating a right turn, as indicated by ARROW A, and thereby swings tongue assembly 19 in the same direction. This serves to shift tie rod 183 transversely in the right direction and causes pivot rods 185 to rotate spindles 105 in a clockwise direction as viewed in FIG. 11. Leg portions 107 then steer front wheels 13 in the right direction to a degree commensurate with the lateral movement of tongue assembly 19. When this occurs, cylinder 193 is moved towards pivot connection 199 of rod 197, thereby retracting rod 197 within cylinder 193. This causes piston 201 to force fluid from chamber 201B through tee fitting 217 and into lines 219 and 221. Since the passage of fluid through 221 is blocked at valve 245, the resulting fluid pressure created by piston 201 is then transmitted through line 219 to tee fitting 223. At this point, the fluid attempts to pass through either line 229 or line 225, through passageway 241 and into line 243. Because line 243 is blocked at control valve 245, the fluid pressure created by piston 201 is therefore relieved through line 229 to chamber 207B of cylinder 203. This causes piston 207 to extend rod 205, thereby imparting transverse movement of tie rod 187 in the right direction. Movement of rod 187 is transmitted to spindles 125 through pivot rods 189 and subsequently causes rear wheels 15 to turn in the left direction, a direction that is both opposite and equal in degree to the direction in which front wheels 13 are turned. Fluid compressed by piston 207 in chamber 207A is passed out cylinder 203 and out into line 237, through passageway 235 of valve 215, into line 214 and finally into chamber 201A of cylinder 193. Should tow vehicle 17 desire to negotiate a left turn, in the direction indicated by ARROW B, the described fluid flow conditions will be exactly reversed. It is therefore shown that steering of plane 1 according to this first system is achieved through tongue assembly 19 which not only directly steers front wheels 13 through tie rod 183, but also indirectly steers rear wheels 15 in an opposite direction and of equal degree through the actuation of front cylinder 193 which in turn actuates rear cylinder 203. This self-contained fluid system is desirable for negotiating most common turns encountered and does not require the utilization of an additional separate and independent pressurized fluid system.

However, when plane 1 is required to negotiate very short or tight turns, particularly during travel over streets and roads, the second alternative system for steering can be utilized in order to provide independent steering action to both front and rear wheel assemblies 13 and 15. This is accomplished by first rotating element 223 of valve 215 ninety degrees in a clockwise direction, when viewed in FIG. 11, so that passageways 235 and 241 are disposed as shown in dotted lines. In this position of element 223, passageway 235 provides fluid communication between lines 237 and 243, and passageway 241 provides communication between lines 214 and 225. By adjusting valve 245 through handle 259, fluid pressure created by pump 247 may be selectively passed through or removed from lines 221 and 243 for directly controlling the steering of rear wheels 15, thereby by-passing the actuation of rear cylinder 203 by front cylinder 193 as previously described for the first alternative system.

By way of example, assuming tow vehicle 17 is negotiating a left turn in the direction of ARROW B, thereby laterally swinging tongue assembly 19 in the left direction and providing corresponding steering of front wheels 13 in the left direction through the coordinated actions of tie rod 183 and spindles 105. When this occurs, fluid pushed out of chamber 201A by piston 201 passes through line 214, through passageway 241 of valve 215 and exits into line 225 and tee fitting 223. Because fluid flowing through this system will normally follow the path of least resistance, fluid from line 225 is received in line 219 and passes into chamber 201B of cylinder 193. Therefore, no operating fluid pressure is passed through line 229 for the purpose of actuating piston 207 in cylinder 203.

Because front wheels 13 have been turned in the left direction by the action of tongue assembly 19, and rear wheels 15 have not been steered as a result thereof, the operator of vehicle 17 must then resort to the independent steering of rear wheels 15 through the actuation of valve 245 by handle 259 in order that rear wheels 15 be steered to the right, but also to a degree that may, according to required conditions, be desirably greater or lesser than the degree in which front wheels 13 were turned to the left. This is effected by placing pressurized fluid through line 243, passing it through passageway 235 in valve 215 and out through line 237 to chamber 207A of cylinder 203. This causes piston 207 to retract rod 205 within cylinder 203, thereby steering wheels 15 in the right direction by the coordinated actions of tie rod 187 and spindles 125. The degree of turn imparted to wheels 15 is controlled independent of front wheels 13 by valve 245 and fluid system 246 on vehicle 17. In negotiating a right turn of plane 1 according to this second alternative system in the direction of ARROW A, the operative fluid flow paths are essentially reversed but, in this case, pressurized fluid from line 221 flows through fitting 223, line 229 and into chamber 207B so that piston 207 may extend rod 205, thereby steering wheels 15 in the left direction as indicated by ARROW B. Again, because fluid flow occurs along the path of least resistance, fluid passing from chamber 201A flows into line 214, through passageway 241 of valve 215, enters tee fitting 223 through line 225 and circulates back to chamber 201B of cylinder 193 through line 219, rather than passing through line 229 to cylinder 203.

As is apparent, the present invention not only provides for a simple and accurate way of assuring the proper alignment and adjustment of the angular disposition of grader blade assemblies for a land plane, but also offers a simple and positive system for setting and maintaining the correct grading depth of the grader blade assemblies. Further, by virtue of the alternative steering systems that permit either coordinated or independent steering of the front and wheel assemblies, the plane of the present invention is capable of being safely and efficiently negotiated by a tow vehicle under virtually all conceivable use and roadway travel conditions.

It is therefore to be understood that the forms and embodiments of the invention herewith shown and described are to be taken as preferred examples of the same and that various changes in the shape, size and arrangement of parts may be resorted to without departing from the spirit of the invention or scope of the subjoined claims.

I claim:
1. A land plane for use in conjunction with a tow vehicle for leveling and grading the ground surface, which plane comprises, in combination:
   (a) a frame including a front section, a center section, and a rear section;
   (b) a front axle;
   (c) a pair of steerable wheels carried by the front axle for supporting the front section;
   (d) a rear axle;
   (e) a pair of steerable wheels carried by the rear axle for supporting the rear section;
   (f) grader means carried by the center section;
   (g) first steering means for steering the front wheels;
   (h) second steering means for steering the rear wheels and selectively engageable with either the first steering means for steering the rear wheels in response to the steering of the front wheels or a separate power supply source for steering the rear wheels independently of the front wheels during movement of the land plane; and
   (i) control means for selectively engaging the second steering means with either the first steering means or the separate power supply source.
2. The plane of claim 1 wherein:
   (a) the first steering means includes:
      i. a pivotal tongue for connecting the plane to the tow vehicle, and
      ii. a first fluid cylinder assembly carried by the front axle; and
   (b) the second steering means includes:
      i. a second fluid cylinder assembly carried by the rear axle, and
      ii. means providing fluid communication between the first and second fluid cylinder assemblies.
3. The plane of claim 2 wherein the control means includes a four-way fluid control valve.
4. The plane of claim 3 wherein the valve includes a rotatable control element having:
   (a) a first passageway for providing fluid communication between the first and second steering means; and

(b) a second passageway for providing fluid communication between the power supply source and the second steering means.

5. The plane of claim 2 wherein the first steering means further includes:
(a) a pair of rotatable spindles carried by the front axle for supporting the front pair of wheels, and
(b) a pivotal rod linkage connecting the tongue to the spindles for rotating the spindles in response to the pivotal movement of the tongue assembly.

6. The plane of claim 2 wherein the second steering means further includes:
(a) a pair of rotatable spindles carried by the rear axle for supporting the rear pair of wheels, and
(b) a pivotal rod linkage connecting the second fluid cylinder assembly to the spindles for rotating the spindles upon actuation of the second fluid cylinder assembly.

7. The plane of claim 1 wherein the frame further includes:
(a) a pivotal connection interconnecting the front section and the center section,
(b) a pivotal connection interconnecting the rear section and the center section,
(c) each of the pivotal connections enabling relative pivotal movement about an axis transverse to the longitudinal axis of the plane, and
(d) means interconnecting the front, center and rear sections for simultaneously swinging the front and rear sections about their pivotal connections with the center section for raising and lowering the center section while simultaneously maintaining the center section substantially parallel to the ground surface.

8. The plane of claim 7 wherein the means interconnecting the sections include:
(a) a fluid cylinder assembly carried by the front section,
(b) an upwardly extending compression bracket carried by the rear section, and
(c) a cable having one end connected to the front section and the other end connected to the compression bracket.

9. The plane of claim 1 wherein the center section further includes means for aligning the grader means with respect to the ground surface.

10. The plane of claim 9 wherein the grader aligning means includes a plurality of rods and means for individually varying the tension of each rod.

11. The plane of claim 1 wherein the front and rear sections each include means for aligning the frame with respect to the ground surface.

12. The plane of claim 11 wherein each frame aligning means include a pair of crossed rods and means for individually varying the tension of each rod.

13. The plane of claim 1 wherein the grader means includes:
(a) a plurality of substantially downwardly extending pivotal blades, and
(b) resilient means for biasing each blade in a forward direction while permitting rearward movement of each blade when the biasing force of the resilient means is exceeded.

14. The plane of claim 13 wherein the resilient means includes a pair of coil springs carried by each blade.

15. The plane of claim 13 further including means for varying the biasing force of the resilient means.

16. The plane of claim 13 further including means to limit the degree of forward bias imparted to each blade by the resilient means.

17. A land plane for use in conjunction with a tow vehicle for leveling and grading the ground surface, which plane comprises, in combination:
(a) a frame including a front section, a center section and a rear section;
(b) a front axle;
(c) a pair of steerable wheels carried by the front axle for supporting the front section;
(d) a rear axle;
(e) a pair of steerable wheels carried by the rear axle for supporting the rear section;
(f) grader means carried by the center section;
(g) means carried by the center section and disposed substantially adjacent the ends thereof for applying tension to the center section to remove sag in the frame between the front and rear wheels and permit vertical alignment of the grader means with respect to the ground surface; and
(h) means carried by each of the front and rear sections for independently applying tension to same to permit aligning the frame with respect to the ground surface.

18. The plane of claim 17 wherein the means for applying tension to the center section includes a plurality of rods and means for individually varying the tension of each rod.

19. The plane of claim 17 wherein the means for applying tension to the front and rear sections each include a pair of crossed rods and means for individually varying the tension of each rod.

20. The plane of claim 17 further including means for stabilizing the rear section with respect to the center section.

21. The plane of claim 20 wherein the stabilizer means includes a rod having its opposite ends pivotally connected to the center section and the rear section.

22. The plane of claim 17 wherein the grader means includes:
(a) a plurality of substantially downwardly extending pivotal blades, and
(b) resilient means for biasing each blade in a forward direction while permitting rearward movement of each blade when the biasing force of the resilient means is exceeded.

23. The plane of claim 22 wherein the resilient means includes a pair of coil springs carried by each blade.

24. The plane of claim 22 further including means for varying the biasing force of the resilient means.

25. The plane of claim 22 further including means to limit the degree of forward bias imparted to each blade by the resilient means.

26. The plane of claim 23 wherein each coil spring is carried adjacent an end of each blade and has its longitudinal axis disposed substantially coaxially with respect to the pivotal axis of the blade.

27. The plane of claim 17 further including:
(a) a pivotal connection interconnecting the front section and the center section;
(b) a pivotal connection interconnecting the rear section and the center section;
(c) each of the pivotal connections enabling relative pivotal movement about an axis transverse to the longitudinal axis of the plane; and
(d) means interconnecting the front, center and rear sections for simultaneously swinging the front and rear sections about their pivotal connections with the center section for raising and lowering the center section while simultaneously maintaining the center section parallel to the ground surface.

28. The plane of claim 27 further including means for varying the degree of relative pivotal movement between the center section and the front and rear sections about the respective pivotal connections.

29. The plane of claim 28 wherein the means for varying the degree of relative pivotal movement includes a plurality of extensible bolts carried by the center section.

30. The plane of claim 17 further including:
 (a) a pair of rotatable spindles carried by the front axle for supporting the front pair of wheels, and
 (b) a pair of rotatable spindles carried by the rear axle for supporting the rear pair of wheels.

31. The plane of claim 30 further including a tongue carried by the front axle for:
 (a) maintaining the front axle and front spindles in a stationary position during relative pivotal movement of the front and center sections, and
 (b) connecting the plane to the tow vehicle.

* * * * *

UNITED STATES PATENT OFFICE
CERTIFICATE OF CORRECTION

Patent No. 4,150,726            Dated April 24, 1979

Inventor(s) Jerry Whitlow

It is certified that error appears in the above-identified patent and that said Letters Patent are hereby corrected as shown below:

On the front page, under Inventor, change "Weitlow" to --Whitlow--.

Signed and Sealed this

*Twenty-first* Day of *August 1979*

[SEAL]

*Attest:*

*Attesting Officer*

LUTRELLE F. PARKER
*Acting Commissioner of Patents and Trademarks*